J. L. MOTT.
Cooking Stove.
No. 166.
Reissued April 30, 1850.
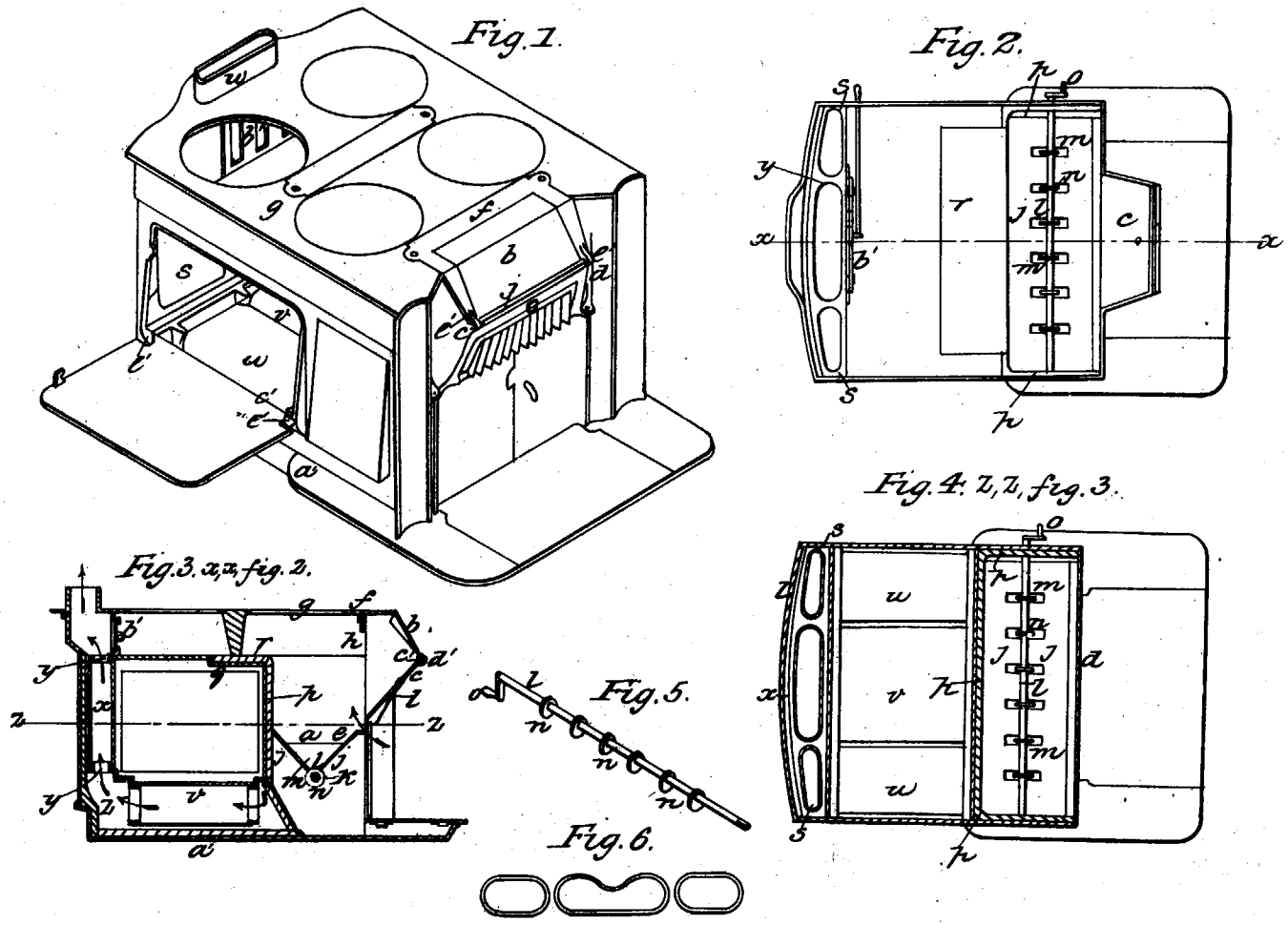
N. PETERS. Photo-Lithographer, Washington, D. C.

UNITED STATES PATENT OFFICE.

JORDAN L. MOTT, OF NEW YORK, N. Y.

IMPROVEMENT IN COOKING-STOVES.

Specification forming part of Letters Patent No. 5,729, dated August 22, 1848; Reissue No. 166, dated April 30, 1850.

*To all whom it may concern:*

Be it known that I, JORDAN L. MOTT, of the city, county, and State of New York, have invented new and useful Improvements in Cooking-Stoves, and in th egrate therefor, which latter is applicable to furnaces in general; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a perspective view of my improved stove; Fig. 2, a horizontal section taken just above the oven; Fig. 3, a vertical section taken at the line *x x* of Fig. 2; Fig. 4, a horizontal section thereof, taken at the line *z z* of Fig. 3; and Fig. 5, a separate view of the shaft of the grate-cleaners.

The same letters indicate like parts in all the figures.

The first part of my invention relates to the method of equalizing the heat to be given to the oven on all sides by increasing the radiating-surface, as the intensity of the temperature of the products of combustion diminishes as they recede from the fire-chamber. With this view the top oven-plate, over which the products of combustion first pass in leaving the fire-chamber, has been covered with some bad conductor of heat, and the bottom, under which the heat passes with the least intensity, I have made of tubes with the view to increase the radiating-surface; but although these tend to equalize the heat in the oven, yet they effect it in part only, and experience has shown that with the view to bake equally in stoves of this kind it became necessary for the cook to turn the articles under treatment in the oven, so that without this attention bad or unequal baking must be the consequence.

The features of novelty in this part of my invention effectually avoid this defect, and consist in covering the forward part—say about one-half of the top plate—of the oven with fire-brick or other bad conductor, and in making the back of the oven of vertical tubes, when this is combined with the bottom of cylindrical or nearly cylindrical tubes, so that the products of combustion when they pass out from the fire-chamber first pass over that part of the oven which is covered with fire-brick, then over the metal plate of the rear part of the top plate, down the two outside back tubes, through the two side bottom flues, back through the middle bottom tube, and up the back middle tube to the chimney, the middle tube at the bottom and back being of greater capacity than either of the side ones. In this way the top, back, and bottom are equally heated, the front being regulated to correspond with these in any of the known modes.

The second part of my invention relates to the method of preventing the heat that passes through the flues from escaping into the room; and it consists in lining the inside of the bottom plate of the stove with any of the known refractory earthy cements. This not only prevents the wasteful radiation of heat into the room, which is not needed in winter, and which is very objectionable in summer; but at the same time this heat which would otherwise be lost is thus retained in the space occupied by the bottom flue-tubes, to be transmitted by conduction to the oven, that the bottom of the oven may thus be enabled, in addition to the enlarged surface for radiation, to give out as much heat as the front, top, and back, and in addition to all this the lining of the bottom in this way will prevent the floor or carpet from being injured or set on fire by the overheating of the bottom plate.

The third part of my invention relates to the making of the front part of the top plate of the stove so that it shall not be broken by unequal expansion or contraction, that part being exposed to a much higher temperature than the other parts of the top plate. In my stove for anthracite coal, in which I use a feeder for preparing the coal, much inconvenience has arisen from the frequent breaking of that part of the top plate of the stove, which also constitutes the top plate of the feeder, in consequence of the temperature to which it is exposed being much greater there than at the other parts of the top plate. The third part of my invention consists, therefore, in making this part of the top plate separate from the rest that it may be secured thereto by screw or other bolts to admit of the unequal expansion and contraction without breaking, the sides of the top plate being connected in front, if desired, to prevent warping when casting, by a narrow plate sunk sufficiently below the surface to receive the separate piece of the top plate and to make a bed therefor, and which is not injured for this purpose when cracked by unequal expansion and contraction.

The fourth part of my invention relates to the fire-chamber; and it consists in making the fire-box with a grate for the passage of air in the bottom alone when this is combined with and placed below a coal-feeder, such as I have heretofore patented, with the upper edge of the front part of the fire-box a little below the lower edge of the front plate of the feeder to leave a space for the passage of air into the stratum of coal above what I have termed the "fire-box." In this way the coal in an incandescent state at the bottom is acted upon by the draft from below to supply oxygen for the combustion there, the stratum above which is approaching the incandescent state being provided with the oxygen required by the upper draft, by means of which the carbonic acid produced below (being the product of a perfect combustion there) is prevented from taking up another charge of carbon from the stratum of coal above, which, if permitted, would produce carbonic oxide, a combustible gas which, if permitted to pass out in that condition, would waste the fuel; but by supplying the stratum of coal immediately above the fire-box with a separate draft in an oblique direction toward the flue, the carbon in this part takes up its equivalent of oxygen to form carbonic acid, while the draft through the lower stratum passes in like manner directly to the flue in the condition of carbonic acid. In this way the product of combustion is carbonic acid, or nearly so, an incombustible gas, and which therefore does not in its escape waste any portion of the fuel, as would be the case if it escaped in the condition of carbonic oxide; and the last part of my invention relates to the method of cleansing the grate of cinders, slag, &c.; and it consists in employing, in combination with the grate, a series of eccentric or equivalent cam-formed plates on a shaft so located relatively to the grate that by the rotation of the shaft in either direction the said eccentric or cam-formed plates will pass between the bars of the grate and clear out the cinders or slag.

In the accompanying drawings, *a* represents the fire-chamber, into which the coal is fed through the door *b* of a feeder in front, the bottom *c* of which is cast with the front plate, *d*, and curved backward toward the fire-box *e*, so that the coal thrown into the feeder runs down the bottom thereof into the fire-box as it is consumed. The top *f* of this feeder is cast separate from the top plate, *g*, of the stove and secured to it by screw-bolts which pass through holes large enough to admit of a slight play, so that the plate shall not be cracked by unequal expansion and contraction. The front part of the top plate of the stove is cast with a recess to receive the plate *f*, that the two may be flush, and to prevent the top plate from warping in casting and from breaking in handling the front part of the top plate of the stove may be cast with a thin plate or rib, *h*, to unite the two sides in casting and to prevent breakage in handling, and on which the top plate of the feeder rests. After the plate has been cast and the stove put together, the breaking of this connecting-plate is of no consequence. The fire-box is made of two inclined plates, *j j*, one front and one back, united together by vertical end plates and by two loops or boxes, *k k*, one at each end at the bottom, where the two inclined plates nearly meet, one only of which loops is represented in the drawings by dotted lines, Fig. 3. The lower edges of these plates are grated, as at *m m*. The loops form boxes, in which rest and turn the journals of a shaft, *l*, that lies in the space between the two plates, and on this shaft there are eccentric plates *n*, which, when the shaft is rotated by a crank-handle, *o*, outside, pass between the grate-bars and clean them out. The ashes, cinders, slag, &c., are thus liberated from the grate and discharged. In general the rough edges and faces of these eccentric-plates, due to the casting, will be sufficient to produce, by the vibration of the shaft, a sufficient grinding action to cut or reduce the slag and cinder, so as to insure their passage through the spaces between the grate-bars; but when this is not sufficient then the plates can be serrated at the edges and along their faces. If desired, the plates, instead of being eccentric circles, may be cam-formed; but care must be taken not to have the edges when made cam-formed recessed, but with outward curves, and they must be so shaped as to have the same effect, or nearly so, on the cinder and slag when vibrated in either direction, for it is by the vibrating action that the hard pieces of slag are separated. The upper edge of the front plate of the fire-box is placed a short distance below the lower edge of the feeder to leave a free space (see the arrows) for the introduction of the draft to that part of the coal which lies above a plane passing from the bottom of this draft-opening to the flue, for the purpose of supplying the coal, which is there partially ignited, with the required quantity of air for its combustion, and as the coal lies in an inclined stratum on the bottom of the feeder and extending thence down to the back plate of the fire-box the stratum of coal through which the draft passes is always kept at the proper thickness to insure a proper combustion. The draft for the lower stratum of coal—that is, the part in the fire-box and below the upper draft just described—passes through the grate at the bottom and acts on the coal resting thereon, which, when the furnace is in full action, is in an incandescent state, and as it is gradually consumed the mass above, which is gradually prepared, is forced down by gravity to replenish the fire-box. In this way the stratum of coal is always kept of the required thickness to enable the oxygen of the atmosphere in passing through to unite as near as possible with the proportion of carbon which will produce carbonic acid, the product of a perfect combustion and no more; and as the greater portion of fuel lies on that part of the fire-box which is not perforated the coal is not exposed to the cooling effects of the draft, as in an open grate, except where the draft must pass through—viz., at the bottom—to supply the combustion of that part of the mass which is in the fire-box, and between the top of the fire-box and the lower edge of the feeder, that part of the mass above being supplied by the upper draft that it may be prepared for the fire-box. The ends and back of the fire-chamber may be lined with fire-brick *p p p* in the usual manner. The products of combustion pass from the back of the fire-chamber over the top of the oven, the forward half of which is sunken, as at *q*, to receive fire-brick *r* or other refractory earthy substance, that its upper surface may be flush with the rear part of the plate. From this the draft divides and passes down two vertical tubes, *s s*, at the back and within the back plate, *t*, of the stove; thence along two horizontal tubes, *u u*, at the bottom, around the ends thereof, into and back through another tube, *v*, between the two tubes *u u*, and then up to the exit-pipe *w* through a vertical tube, *x*, at the back and between the tubes *s s*. The tubes *s s* and *x* have their upper and lower ends let into collar-plates, as at *y*, and constitute the back of the oven, and therefore present a much greater surface for the radiation of heat than a flat plate would, and the tubes *u u* and *v* constitute the bottom of the oven, and are in like manner connected at the ends by being let into end plates. At the back the horizontal tubes *u u* and *v* communicate with the vertical tubes *s s* and *x* by means of partition-plates *z z*. It should be observed that the middle tubes of the back and bottom series are made of greater capacity than those each side of them, as the draft that passes through the two side tubes of each series has to return through the single middle one. That face of the tube which is inside of the oven may be made with a double curve, as represented in the cross-section, Fig. 6, by which the radiating surface will be much increased. The plates surrounding the oven, as the back plate, *t*, and the bottom plate, *a'*, which inclose the series of tubes, are lined with some earthy refractory cement or polished metallic substance to prevent the escape of heat from them into the room, so that the heat radiating from the outer surface of the tubes will circulate and pass up between the tubes into the oven, and thus save much of the heat, which would otherwise be transmitted to the room, at the same time avoiding the possibility of charring or injuring the floor and wall or partition against which the back of the stove may be placed, thus avoiding what has heretofore been a source of great inconvenieuce.

For the purpose of kindling the fire there is a register-valve, *b'*, that leads from the flue above the oven into the exit-pipe to give a direct draft for kindling the fire.

For the purpose of making the hinged edges of the oven-door as nearly air-tight as possible, it is made with a round bead, *c'*, that rolls in a concave, *d'*, which is a projection from the stove-plate in the form of a segment of a cylinder, the ends *e' e'* of which extend around farther to form boxes for the journals of the hinge, which are made within the length of the door. In this way the whole edge of the door turns in a sleeve or hinge-case, and when the door is closed against the frame the bead on the lower edge will be forced back against the inner face of this sleeve or case to make a close or air-tight joint. The hinge of the door of the feeder is made in the same way, (see corresponding letters,) as it is highly important to have it air-tight to prevent the inward draft, for the introduction of atmospheric air at this place would consume the combustible gases distilled from the coal in the feeder, where the heat which would be thus produced is not wanted.

Some of the advantages arising from the improvements above described in the fire-chamber, fire-box, and grate-cleaners may be obtained under various modifications—as, for instance, the advantages of the double draft may be obtained by making the fire-box with a flat grate, the front and back being vertical and tight, or with the grate extending up in front, with the front doors of the stove shut against it when desired to shut out the draft from the front part.

The advantages arising from having the front and back of the fire-box inclined may be realized to some extent without the feeder and grate-cleaner; and the grate-cleaners may be employed with a grate having straight bars by placing the shaft below the grate, and when the length of the grates requires it any desired number of shafts with cleaners thereon may be placed under the grates at such distance apart as to work clear of each other, the shafts outside of the furnace being provided with a crank-handle to be worked separately, or all connected together to be rotated at the same time.

It will be obvious from the foregoing that the fire-box and grate-cleaners above described are applicable to other furnaces as well as to cooking and other stoves, and that the grate-cleaner is also applicable to open grates, and therefore I wish it to be distinctly understood that I do not wish to limit myself to the use of these in the fire-places of cooking and other stoves.

What I claim as my invention, and desire to secure by Letters Patent, is—

1. Making the back of the oven of a series of vertical flue-tubes, in combination with the flue-tubes in the bottom, substantially as herein described, to equalize the heat of the oven.

2. Lining the inside surface of the bottom plate of the stove with some refractory earthy cement or polished substance, as described, in combination with the series of flue-tubes constituting the back and bottom of the oven, for the purpose and in the manner substantially as described.

3. Making the front part of the top plate separate from and attached to the top plate by bolts or otherwise, substantially as described, when combined with the sunken connecting-piece *h*, whereby the cracking consequent upon overheating and unequal expansion and contraction of that part which is exposed to a high temperature is prevented.

4. The combination of a fire-box made with a grate or openings for draft in the bottom thereof, substantially as described, with the coal-feeder having an aperture or apertures for draft between it and the upper edge of the fire-pot, substantially in the manner and for the purpose above described.

I am aware that a series of hook-formed wipers playing between the grate-bars and arranged on a shaft have been heretofore patented for cleaning the grates of an iron-furnace; but these can only be turned in one direction by reason of their hook form, and on this account are not practically useful. I do not therefore claim, broadly, the use of cam-formed wipers, unless they are so formed that they can be operated in opposite directions; but I do finally claim—

5. In combination with a grate, a series of eccentric plates or cam-formed plates of equivalent form arranged on a shaft, so located relatively to the grate-bars as, by the vibration of the shaft in either direction, the said plates shall play between the grate-bars and separate and clear out cinder, slag, and other hard substances, substantially as herein described.

JORDAN L. MOTT.

Witnesses:
AUGUSTUS F. WEEKES,
M. D. VAN DOREN.